US008554224B2

(12) United States Patent
Soliman et al.

(10) Patent No.: US 8,554,224 B2
(45) Date of Patent: Oct. 8, 2013

(54) CELLULAR NETWORK ENERGY SAVING

(75) Inventors: Samir S. Soliman, San Diego, CA (US);
Olufunmilola O. Awoniyi, San Diego,
CA (US); Osok Song, San Diego, CA
(US); Jangwon Lee, San Diego, CA
(US); Miguel Griot, San Diego, CA
(US); Ramachandran Subramanian,
San Diego, CA (US)

(73) Assignee: QUALCOMM Incorporated, San
Diego, CA (US)

( * ) Notice: Subject to any disclaimer, the term of this
patent is extended or adjusted under 35
U.S.C. 154(b) by 55 days.

(21) Appl. No.: 13/070,398

(22) Filed: Mar. 23, 2011

(65) Prior Publication Data

US 2011/0237257 A1    Sep. 29, 2011

Related U.S. Application Data

(60) Provisional application No. 61/317,273, filed on Mar. 24, 2010, provisional application No. 61/327,784, filed on Apr. 26, 2010, provisional application No. 61/394,595, filed on Oct. 19, 2010.

(51) Int. Cl.
*H04W 36/00* (2009.01)

(52) U.S. Cl.
USPC ........... 455/436; 455/443; 455/444; 455/449; 455/453; 455/450

(58) Field of Classification Search
USPC .................. 455/436, 443, 444, 449, 453, 450
See application file for complete search history.

(56) References Cited

U.S. PATENT DOCUMENTS

| 5,517,503 | A  | 5/1996  | Hess          |
|-----------|----|---------|---------------|
| 6,584,330 | B1 | 6/2003  | Ruuska        |
| 6,978,138 | B2 | 12/2005 | Japenga et al. |
| 7,702,303 | B2 | 4/2010  | Todd et al.   |
| 8,023,444 | B2 | 9/2011  | Bowser et al. |
| 8,270,975 | B2 | 9/2012  | Kim et al.    |

(Continued)

FOREIGN PATENT DOCUMENTS

| EP | 2056628 A1 * | 5/2009 |
| EP | 2056628 A1   | 5/2009 |

(Continued)

OTHER PUBLICATIONS

Huawei "Overview to LTE energy saving solution to cell switch off/on", 3GPP TSG-RAN WG3#66bis, Valencia, Spain, Jan. 18-22, 2010.*

(Continued)

*Primary Examiner* — Kwasi Karikari
*Assistant Examiner* — Khai M Nguyen
(74) *Attorney, Agent, or Firm* — Jeffrey D. Jacobs

(57) ABSTRACT

Various arrangements for managing wireless network communication are described. Two cells using different radio access technologies (RATs), such as a 3G cell and a 4G cell, may provide overlapping coverage. A first cell using a first RAT, under certain circumstances, may be permitted to enter a powered down state such that less power is consumed. User equipment may communicate with the cell using the second RAT as the preferred network and only communicate with the cell using the first RAT when a service available through the first RAT but not the second RAT has been requested. Upon a request from the second cell, the first cell may enter a powered up state.

16 Claims, 12 Drawing Sheets

(56) References Cited

U.S. PATENT DOCUMENTS

| | | | |
|---|---|---|---|
| 2009/0233600 | A1 | 9/2009 | Johansson et al. |
| 2009/0268654 | A1 | 10/2009 | Baglin et al. |
| 2009/0280854 | A1 | 11/2009 | Khan et al. |
| 2010/0113010 | A1 | 5/2010 | Tenny et al. |
| 2010/0234013 | A1 | 9/2010 | Schmitt |
| 2010/0250992 | A1* | 9/2010 | Iyer et al. ................. 713/340 |
| 2011/0044284 | A1 | 2/2011 | Voltolina et al. |
| 2012/0244869 | A1 | 9/2012 | Song et al. |
| 2012/0329449 | A1 | 12/2012 | Das et al. |

FOREIGN PATENT DOCUMENTS

| | | | |
|---|---|---|---|
| EP | 2117279 | A1 | 11/2009 |
| EP | 2117279 | A1 * | 11/2009 |
| WO | WO2009068138 | A1 | 6/2009 |
| WO | WO 2010077193 | A1 * | 7/2010 |
| WO | WO2011009415 | A1 | 1/2011 |

OTHER PUBLICATIONS

3GPP: "3rd Generation Partnership Project; Technical Specification Group Radio Access Networks; Evolved Universal Terrestrial Radio Access (E-UTRA) ; Potential solutions for energy saving for E-UTRAN (Release 10)", 3GPP Draft; TR 36.927 V1.1.1 , 3rd Generation Partnership Project (3GPP), Mobile Competence Centre ; 650, Route Des Lucioles ; F-06921 Sophia-Anti Polis Cedex ; France, vol. RAN WG3, no. Taipei, Taiwan; 20110221, Mar. 6, 2011, XP050497946, [retrieved on Mar. 6, 2011].

3GPP: "3rd Generation Partnership Project; Technical Specification Group Radio Access Networks; Evolved Universal Terrestrial Radio Access (E-UTRA) ; Potential solutions for energy saving for E-UTRAN (Release 10)", 3GPP Draft; TR 36.927, 3rd Generation Partnership Project (3GPP), Mobile Competence Centre; 650, Route Des Lucioles; F-06921 Sophia-Anti Polis Cedex; France, No. V1.0.0, Nov. 2010, pp. 1-19.

3GPP: "3rd Generation Partnership Project; Technical Specification Group Services and System Aspects; Telecommunication management; Application guide for use of Integration Reference Points (IRPs) on Peer-to-Peer (P2P) Interface (Release 7)", 3GPP Draft; TR 32.806, 3rd Generation Partnership Project (3GPP), Mobile Competence Centre; 650, Route Des Lucioles; F-06921 Sophia-Anti Polis Cedex; France, No. V2.0.0, Jun. 2006, pp. 1-12.

3rd Generation Partnership Project; Technical Specification Group Services and System Aspects; Telecommunication management; Energy Saving Management (ESM); Concepts and requirements (Release 10), 3GPP Standard; 3GPP TS 32.551, 3rd Generation Partnership Project (3GPP), Mobile Competence Centre ; 650, Route Des Lucioles ; F-06921 Sophia-Antipolis Cedex ; France, No. V10.0.1, Feb. 8, 2011, pp. 1-22, XP050476245, [retrieved on Feb. 8, 2011].

3rd Generation Partnership Project; Technical Specification Group Services and System Aspects; Telecommunication management; Study on Energy Savings Management (ESM) (Release 10), 3GPP Standard; 3GPP TR 32.826, 3rd Generation Partnership Project (3GPP), Mobile Competence Centre ; 650, Route Des Lucioles ; F-06921 Sophia-Antipolis Cedex ; France, No. V10.0.0, Mar. 30, 2010, pp. 1-33, XP050402127, [retrieved on Mar. 30, 2010].

Anonymous, "Method to increase power efficiency in a mixed GSM/UMTS network," Research Disclosure, Mason Publications, Hampshire, GB, vol. 471, No. 88, Jul. 1, 2003 XP007133045, p. 4 lines 23-40.

Blume, et al., "Energy savings in Moblie Networks Based on Adaptation to Traffic Statistics", Bell Labs Technical Journal, vol. 15, Issue 2, pp. 77-94, Sep. 2010.

Choungmo Fofack Nicaise Eric, "Cooperative Base Stations for Green Cellular Networks", Feb. 24, 2010.

Huawei et al., "Energy Saving in UTRAN", 3GPP Draft; R3-092342 Energy Saving UMTS Disc, 3rd Generation Partnership Project (3GPP), Mobile Competence Centre ; 650, Route Des Lucioles ; F-06921 Sophia-Antipolis Cedex ; France, no. Miyazaki; 20091012, Oct. 12, 2009, XP050391867, [retrieved on Oct. 3, 2009].

Huawei: "Overview to LTE energy saving solutions to cell switch off/on", 3GPP Draft; R3-100162, 3rd Generation Partnership Project (3GPP), Mobile Competence Centre ; 650, Route Des Lucioles ; F-06921 Sophia-Antipolis Cedex ; France, vol. RAN WG3, no. Valencia, Spain; 20100118, Jan. 15, 2010, XP050424028, [retrieved on Jan. 15, 2010].

International Search Report and Written Opinion—PCT/US2011/029874, ISA/EPO—Jun. 22, 2011.

Kolios, P. et al., "Switching Off Low Utilization Base Stations Via Store Carry and Forward Relaying", Personal, Indoor and Mobile Radio Communications Workshop (PIMRC Workshops), 2010 IEEE 21st International Symposium on vol., no., pp. 312-316, Sep. 26-30, 2010.

Lee, S. H., et al.: "An energy efficient power control mechanism for base stations in mobile communication systems," 2011 International Conference on Information Networking (ICOIN), Jan. 26-28, 2011, pp. 378-383, Barcelona, See Abstract, Section I, and Section II.

Marsan, M.A., et al.,: "Optimal Energy Savings in Cellular Access Networks," IEEE International Conference on Communications Workshops, 2009. ICC Workshops 2009. Jun. 14-18, 2009, pp. 1-5, Dresden, See Abstract, Section I, Section III.

Zhou, S. et. al.: "Green Mobile Access Network with Dynamic Base StationEnergy Saving," MobiCom09, Sep. 20-25, 2009, Beijing, China, See: Abstract, Sections I-II, and Table 1.

Kalyanasundaram S. et al., "Signaling Reduction in Idle Mode for Inter-technology Mobility," 2007 IEEE 65th Vehicular Technology Conference (IEEE Cat No. 07CH37784), ISBN-10: 1-4244-0265-4; Conference: 2007 IEEE 65th Vehicular Technology Conference, Apr. 22-25, 2007, Dublin, Ireland; Publisher: IEEE, Piscataway, NJ, USA, Abstract, 1 page.

Correia L.M., et al.,"Challenges and enabling technologies for energy aware mobile radio networks", IEEE Communications Magazine, IEEE Service Center, Piscataway, US, vol. 48, No. 11, Nov. 1, 2010, pp. 66-72, XP011320499, ISSN: 01636804.

* cited by examiner

CELLULAR NETWORK ENERGY SAVING

CROSS-REFERENCES TO RELATED APPLICATIONS

This application claims priority to U.S. Appl. No. 61/394,595, entitled "System and Method for Network Energy Saving," filed Oct. 19, 2010. This application also claims priority to U.S. Appl. No. 61/327,784, entitled "System and Method for Network Energy Saving," filed Apr. 26, 2010. This application further claims priority to U.S. Appl. No. 61/317,273, entitled "Network Energy Saving Scheme," filed Mar. 24, 2010. Each of these three applications is hereby incorporated by reference for all purposes.

BACKGROUND

Advanced cellular networks, such as networks based on the LTE standard (Long-Term Evolution, a standard used by some "4G" networks), are being deployed throughout the country and world. 4G networks allow for data-intensive applications to be performed by user equipment (e.g., cellular phones, including smart phones, laptops, and tablet computers). 4G networks, which include 4G cells that wirelessly communicate with user equipment (referred to as UE), may consume a significant amount of power, which is wasteful if no UE is utilizing the 4G services provided by a 4G cell of the 4G network.

SUMMARY

Systems, methods, apparatuses, and devices are provided for managing wireless network communications. An example of a system for managing wireless network communication, may include a first cell that uses a first radio access technology (RAT), the first cell having a powered up state and a powered down state. The first cell may transmit and receive data with a plurality of UEs. The system may comprise a second cell using a second RAT, may be configured to: communicate with the first cell; provide wireless service to the plurality of UEs at least when the first cell that uses the first RAT is in the powered down state; and transfer at least one UE of the plurality of UEs to use the first cell when the first cell is in the powered up state.

Embodiments of such a system may include one or more of the following: Based on a first set of one or more predefined conditions, the first cell may enter the powered down state wherein the first cell consumes less power in the powered down state than in the powered up state. Based on a second set of one or more predefined conditions, the first cell may enter the powered up state, wherein the first cell consumes more power in the powered up state than in the powered down state. Also, if none of the plurality of UEs is using a service supported by the first RAT but not the second RAT, the first cell may be permitted to enter the powered down state. The first set of one or more predefined conditions may comprise a condition that if a load on the first cell that uses the first RAT is below a predefined threshold, the first cell may be permitted to enter the powered down state. The first set of one or more predefined conditions may comprise a condition that if a timer for entering the power down state has triggered, the first cell is permitted to enter the powered down state. The second set of one or more predefined conditions may comprise a condition that if a portion of the plurality of UEs receiving service from the second cell report weak signals, the first cell is requested to enter the powered up state. The second set of one or more predefined conditions may comprise a condition that if a particular UE receiving service from the second cell requests a quality of service or application that is not supported by the second RAT but is supported by the first RAT, the first cell is requested to enter the powered up state. The second set of one or more predefined conditions may comprise a condition that if a load of the second cell using the second RAT exceeds a threshold load, the first cell is requested to enter the powered up state. The second set of one or more predefined conditions may comprise a condition that, if a timer for exiting the power down state has triggered, the first cell is permitted to enter the powered up state.

Further, embodiments of the system may include one or more of the following: A radio access network (RAN) may be present that uses the second RAT and comprises the second cell, wherein: the first set, the second set, or both sets of one or more predefined conditions are configured to be evaluated by the RAN. The system may include a core network of the second RAT and comprises the second cell, wherein the first set, second set, or both sets of one or more predefined conditions are configured to be evaluated by the core network. The radio access network is selected from a group consisting of: a UMTS radio access network (UTRAN); and a GSM Edge radio access network (GERAN). The first cell may comprise an eNodeB and the first RAT may be LTE, wherein: the first set, the second set, or both sets of one or more predefined conditions is configured to be evaluated by the eNode B. The system may include a radio network controller that uses the second RAT and communicates with the second cell, wherein: the second set of one or more predefined conditions is configured to be evaluated by the radio network controller. The second cell that uses the second RAT may be further configured to: during or following the first cell entering the powered up state, broadcast information to at least a portion of the plurality of UEs that instructs the portion of the plurality of UEs to make the first RAT preferred over the second RAT. The second cell that uses the second RAT may be further configured to: during or following the first cell entering the powered down state, broadcast information to at least a portion of the plurality of UEs that instructs the portion of the plurality of UEs to make the second RAT preferred over the first RAT. The first cell that uses the first RAT may be further configured to participate in an inter-RAT handover process to move one or more UEs of the plurality of UEs to the second cell that uses the second RAT. The second cell that uses the second RAT may be further configured to participate in an inter-RAT handover process to move one or more UEs of the plurality of UEs to the first cell that uses the first RAT.

An example of a method for managing wireless network communication, may comprise: providing, by a first cell, wireless service to plurality of UEs at a first service level, wherein: the first cell uses a first radio access technology (RAT); and the first cell has a powered up state and a powered down state. The method may comprise providing, by a second cell, wireless service to the plurality of UEs, wherein: the second cell uses a second radio access technology; and the second cell provides wireless service to the plurality of UEs at least when the first cell that uses the first RAT is in the powered down state. The method may also comprise transferring at least one UE of the plurality of UEs from the second cell to use the first cell when the first cell is in the powered up state.

Embodiments of the method may include one or more of the following: Based on a first set of one or more predefined conditions, entering, by the first cell, the powered down state wherein the first cell consumes less power in the powered down state than in the powered up state; and based on a second set of one or more predefined conditions, entering, by the first cell, the powered up state, wherein the first cell consumes more power in the powered up state than in the powered down state. The first set of one or more predefined conditions may comprise a condition that, if none of the plurality of UEs is using a service supported by the first RAT but not the second RAT, the first cell is permitted to enter the powered down state. The first set of one or more predefined conditions may comprise a condition that if a load on the first cell that uses the first RAT is below a predefined threshold, the first cell is permitted to enter the powered down state. The first set of one or more predefined conditions may comprise a condition that if a timer for entering the power down state has triggered, the first cell is permitted to enter the powered down state. The second set of one or more predefined conditions may comprise a condition that if a portion of the plurality of UEs receiving service from the second cell report weak signals, the first cell is requested to enter the powered up state. The second set of one or more predefined conditions may comprise a condition that if a particular UE receiving service from the second cell requests a quality of service or application that is not supported by the second RAT but is supported by the first RAT, the first cell is requested to enter the powered up state. The second set of one or more predefined conditions may comprise a condition that if a second RAT load exceeds a threshold load, the first cell is requested to enter the powered up state, wherein: the second RAT load comprises loads for multiple cells that use the second RAT; and the second RAT load comprises a load for the second cell. The second set of one or more predefined conditions may comprise a condition that, if a timer for entering the power down state has triggered, the first cell is permitted to enter the powered up state. The first RAT may be a 4G RAT and the second RAT may be a 3G RAT. The first cell may comprise an eNodeB and the first RAT is LTE, wherein: the first set of one or more predefined conditions is configured to be evaluated by the eNode B.

Further, embodiments of the method may include one or more of the following: Transferring at least one UE of the plurality of UEs from the second cell to use the first cell when the first cell is in the powered up state may comprise: broadcasting, by the second cell, information to at least a portion of the plurality of UEs that instructs the portion of the plurality of UEs to make the first RAT preferred over the second RAT. Transferring at least one UE of the plurality of UEs from the second cell to use the first cell when the first cell is in the powered up state may comprise: performing, by the first cell and the second cell, an inter-RAT handover process to move one or more UEs of the plurality of UEs to the first cell that uses the first RAT from the second cell that uses the second RAT.

An example of a computer program product residing on a non-transitory processor-readable medium may comprise processor-readable instructions configured to cause a processor to: cause a first cell to provide wireless service to plurality of UEs at a first service level, wherein: the first cell uses a first radio access technology (RAT); and the first cell has a powered up state and a powered down state. The processor-readable instructions configured to cause a processor to: cause a second cell to provide wireless service to the plurality of UEs, wherein: the second cell uses a second radio access technology; and the second cell provides wireless service to the plurality of UEs at least when the first cell that uses the first RAT is in the powered down state. The processor-readable instructions may also be configured to cause a processor to: cause one or more UEs of the plurality of UEs to be transferred to use the first cell from the second cell when the first cell is in the powered up state.

Embodiments of the computer program product may include one or more of the following: Processor-readable instructions configured to cause the processor to: based on a first set of one or more predefined conditions, cause the first cell to enter the powered down state wherein the first cell consumes less power in the powered down state than in the powered up state; and based on a second set of one or more predefined conditions, cause the first cell to enter the powered up state, wherein the first cell consumes more power in the powered up state than in the powered down state. The first set of one or more predefined conditions may comprise a condition that, if none of the plurality of UEs is using a service supported by the first RAT but not the second RAT, the first cell is permitted to enter the powered down state. The first set of one or more predefined conditions may comprise a condition that if a load on the first cell that uses the first RAT is below a predefined threshold, the first cell is permitted to enter the powered down state. The first set of one or more predefined conditions may comprise a condition that if a timer for entering the power down state has triggered, the first cell is permitted to enter the powered down state. The second set of one or more predefined conditions may comprise a condition that if a portion of the plurality of UEs receiving service from the second cell report weak signals, the first cell is requested to enter the powered up state. The second set of one or more predefined conditions may comprise a condition that if a particular UE receiving service from the second cell requests a quality of service or application that is not supported by the second RAT but is supported by the first RAT, the first cell is requested to enter the powered up state. The second set of one or more predefined conditions may comprise a condition that if the load of the second cell using the second RAT exceeds a threshold load, the first cell is requested to enter the powered up state. The second set of one or more predefined conditions may comprise a condition that, if a timer for entering the power down state has triggered, the first cell is permitted to enter the powered up state. The first RAT may be a 4G RAT and the second RAT may be a 3G RAT.

The processor-readable instructions configured to cause the processor to cause one or more UEs of the plurality of UEs to be transferred to use the first cell from the second cell when the first cell is in the powered up state may comprise processor-readable instructions configured to cause the processor to: cause the second cell to broadcast information to at least a portion of the plurality of UEs that instructs the portion of the plurality of UEs to make the first RAT preferred over the second RAT. The processor-readable instructions configured to cause the processor to cause one or more UEs of the plurality of UEs to be transferred to use the first cell from the second cell when the first cell is in the powered up state further may comprise processor-readable instructions configured to cause the processor to: cause the first cell and the second cell to perform an inter-RAT handover process to move one or more UEs of the plurality of UEs to the first cell that uses the first RAT from the second cell that uses the second RAT.

An example of a apparatus for managing wireless network communication, may comprise: a first means for providing wireless service to plurality of UEs at a first service level using a first radio access technology (RAT) wherein: the first means has a powered up state and a powered down state. The apparatus may also comprise a second means for providing wireless service to the plurality of UEs using a second radio access technology, wherein: the second means provides wireless service to the plurality of UEs at least when the first means that uses the first RAT is in the powered down state. The apparatus may also comprise means for transferring at least one UE of the plurality of UEs from the second means to use the first means when the first means is in the powered up state.

Embodiments of the method may include one or more of the following: A third means for entering the first means in the powered down state based on a first set of one or more predefined conditions, wherein the first means consumes less power in the powered down state than in the powered up state; and a fourth means for entering the first means in the powered up state based on a second set of one or more predefined conditions, wherein the first means consumes more power in the powered up state than in the powered down state. The first set of one or more predefined conditions may comprise a condition that, if none of the plurality of UEs is using a service supported by the first RAT but not the second RAT, the first means is permitted to enter the powered down state.

The first set of one or more predefined conditions may comprise a condition that if a load on the first cell that uses the first RAT is below a predefined threshold, the first means is permitted to enter the powered down state. The first set of one or more predefined conditions may comprise a condition that if a timer for entering the power down state has triggered, the first means is permitted to enter the powered down state. The second set of one or more predefined conditions may comprise a condition that if a portion of the plurality of UEs receiving service from the second means report weak signals, the first means is requested to enter the powered up state. The second set of one or more predefined conditions may comprise a condition that if a particular UE receiving service from the second means requests a quality of service or application that is not supported by the second RAT but is supported by the first RAT, the first means is requested to enter the powered up state. The second set of one or more predefined conditions may comprise a condition that if a load comprising a load of the second means using the second RAT has exceed a threshold load, the first means is requested to enter the powered up state. The second set of one or more predefined conditions may comprise a condition that, if a timer for entering the power down state has triggered, the first means is permitted to enter the powered up state. The first RAT may be a 4G RAT and the second RAT may be a 3G RAT.

The third means for transferring at least one UE of the plurality of UEs from the second means to use the first means when the first means is in the powered up state may comprise: a fourth means for broadcasting information to at least a portion of the plurality of UEs that instructs the portion of the plurality of UEs to make the first RAT preferred over the second RAT. The third means for transferring at least one UE of the plurality of UEs from the second means to use the first means when the first means is in the powered up state may comprise: a fourth means for performing an inter-RAT handover process to move one or more UEs of the plurality of UEs to the first means that uses the first RAT from the second means that uses the second RAT.

DETAILED DESCRIPTION

Figure 1:
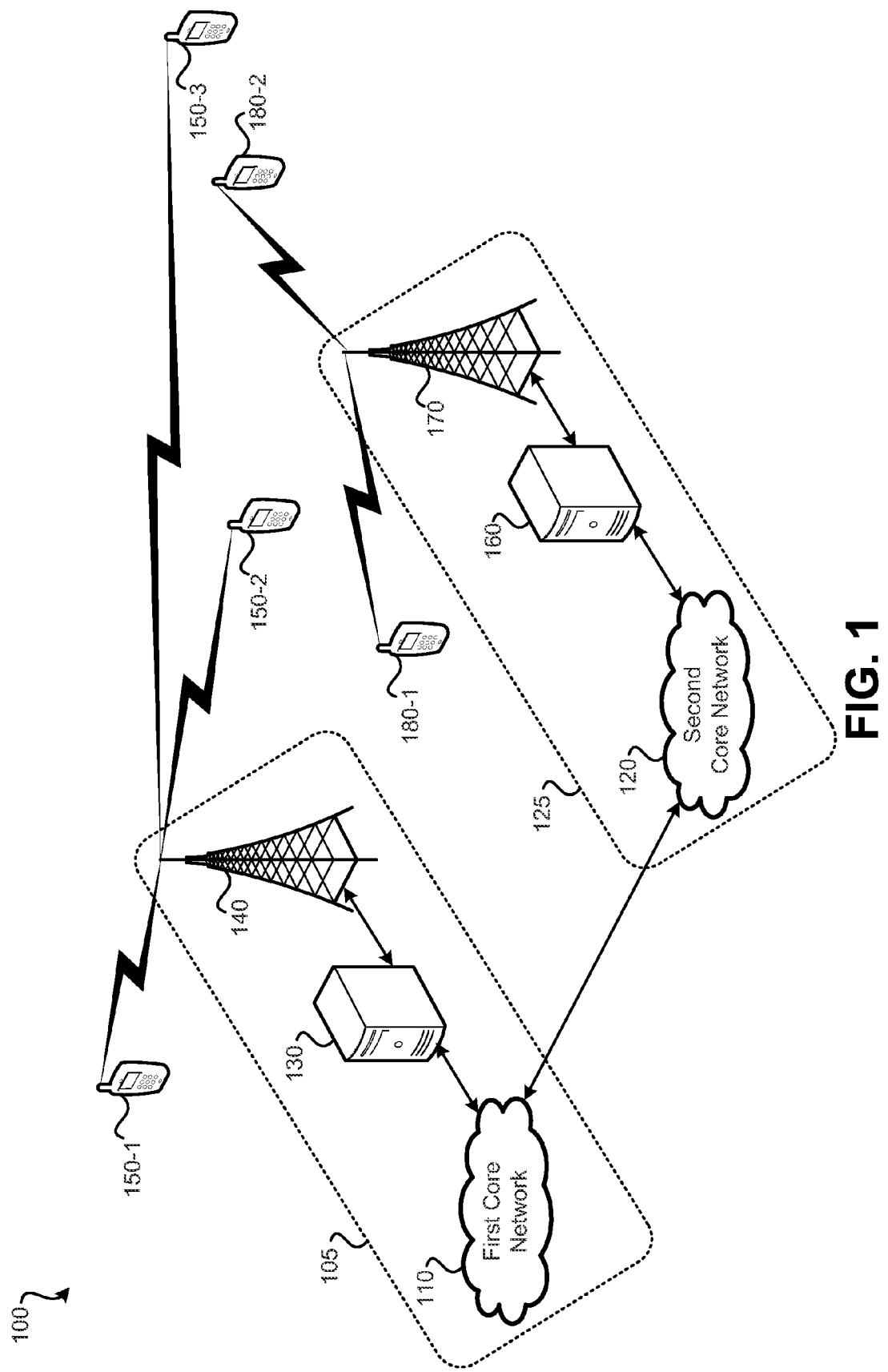
FIG. 1 illustrates an embodiment of a system that includes cells of two networks that utilize different radio technology to provide cellular service to a plurality of UEs.

In some geographic areas, multiple networks, including a 4G network, are present. For example, a 3G network or 2G network and a 4G network can both be wirelessly accessible in certain geographic areas. In such an instance, the 4G network may be referred to as the overlay network and the 3G or 2G network may be referred to as the underlay network because the 3G/2G network may provide broad coverage while the 4G coverage is sporadically deployed within a portion of the 3G/2G coverage. While some services, such as video chat or gaming, may only be available via the 4G network, other services can be adequately performed using a service level below 4G. For example, a text message, phone call or web browsing can be adequately handled using a 3G or 2G network.

If a unit of UE is capable of using multiple networks that utilize different radio technologies, such as 3G and 4G, or 2G, 3G, and 4G, the unit of UE may be instructed by the cell that the UE is communicating with to function in either a 3G or 2G mode when the service the UE is requesting does not require use of a 4G network. By having UE function on a lower service level network when 4G-specific services are not requested, a 4G cell of the 4G network may not provide service to any UE. In such a situation, the cell of the 4G network can enter a powered down state. In the powered down state, the cell of the 4G network is not communicating with UEs or only sporadically communicating with UEs. In this powered down state, the cell of the 4G network consumes less power than when the cell of the 4G network is in a powered up state. The powered down state may not mean that no power is being consumed by the cell. Rather, less power is being consumed by the cell than when the cell is in the powered up state. Further, in the powered down state, the 4G cell may sporadically transmit and receive data, such as in a discontinuous transmission mode.

By way of example only, consider the situation of a 4G cell of a 4G network operating with a coverage area overlapping a coverage area of a 3G cell of a 3G network. If the 3G and 4G cells are located in business districts, during a workday significant use of each network is likely to occur. However, during off-peak hours, such as late at night and/or on the weekends, little, if any, utilization of 4G-specific services (services preferably or exclusively provided by a 4G network) may occur. Nonetheless, the 4G cell of the 4G network could be powered on, transmitting, and, thus, consuming significant power, while providing service to no UEs or very few units of UEs. As such, to conserve power, the 4G cell can enter a powered down state based on various conditions (e.g., time of day, day of week, number of units of UE that service is being provided to) to conserve power. UE that would be accessing the 4G cell can instead access the 3G cell of the 3G network for all services except 4G-specific services.

If a 4G cell is in a powered down state, services are provided to UE via a 3G (or 2G) cell that provides coverage in the same geographic area. If UE requests a 4G-specific service while the 4G cell of the 4G network that would provide coverage to the requesting UE is in a powered down state, the request for the 4G specific service is transmitted to the 3G cell providing coverage in the area. The 3G cell sends a request, via the 3G and 4G networks, to the 4G cell that requests the 4G cell enter a powered up state such that the UE is provided with the requested 4G specific service. Based upon an evaluation performed by the 4G cell, the 4G cell may or may not power up to perform the requested service. For example, the 4G cell may only power up if the request is received at certain times of day.

In another example, the 4G network can be providing similar service as provided on the 3G/2G network to UEs. In such examples, the 4G network is typically deployed to provide additional network capacity to support more UEs. When this additional capacity is not required (e.g., the network load on the 4G cell is below a specified threshold) the 4G cell can be powered off while any UE previously being served on the 4G cell is transferred to the 3G/2G cell.

The 4G cell may determine to enter a powered down state based on predefined conditions. For example, the decision to enter a powered down state can be based on the network load on the 4G cell, time of day, day of week, and/or the number of UEs utilizing 4G-specific services. Before entering the powered down state, the 4G cell can confirm with the underlay cell that provides coverage to the overlapping geographical area that the 4G cell has sufficient capacity to provide service to the UE currently receiving service from the 4G cell. The 4G cell hands off UE to the 3G or 2G cell such that the 4G cell no longer provides service to any UE and enters a powered down state.

Configurations that power down a cell using a particular overlay radio access technology (such as 4G) resulting in UE using another radio access technology (such as 3G or 2G) can result in power savings for the overlay radio access technology (also referred to as "RAT"). Power is saved by not having the 4G cell constantly operating in a powered up state. On the UE level, power may also be saved by the UE communicating with a cell using a different RAT for communication. Further, by having UE default to a cell using a RAT providing coverage over a larger geographic area, less "ping-ponging" between overlapping cells of different RATs can be expected with fewer associated inter-RAT (radio access technology) measurements.

The service level of the RAT used by the overlay cell could be a higher service level, which refers to a service that provides faster data transmission rates, lower latency, or other features regarded as superior to a lower service level of the RAT used by the underlay network. As an example, 4G is considered a higher service level as compared to a 3G service level or a 2G service level. Similarly, a 3G service level may be considered a higher service level than 2G. Similar differences may occur in future deployed cellular networks, such as a 5G network being a higher service level compared to a 2G, 3G, or 4G service level. At other times the service level of the RAT used by the overlay cell is similar to the service level provided by the underlay RAT; however, the overlay RAT provides additional network capacity to support more UEs.

While the above relates to a situation where a 4G cell overlays a 2G or 3G cell, this is meant as an example only. More generally, embodiments described herein can be applied to other forms of wireless networks that provide overlapping coverage areas with other wireless networks. For example, a 3G cell may overlay a 2G cell. Wireless networks that are not cellular networks also may be possible.

FIG. 1 illustrates an embodiment of a system 100 that includes two or more cells belonging to two different networks that utilize different radio access technologies (RATs) providing service to UEs. In system 100, first network 105 and second network 125 are present. Network 105 may include first core network 110, entity 130, and base station 140. Second network 125 may include second core network 120, RAN entity 160, and base station 170. Core network 105 can represent a 2G or 3G network, such as a UMTS (Universal Mobile Telecommunications System) network. The first network may be a UMTS, GSM or a CDMA (Code Division Multiple Access) 1× RTT (also referred to as CDMA2000 1X) network. Some features and procedures pertaining to LTE, UMTS and GSM networks are described in documents from the "3rd Generation Partnership Project" (3GPP) while CDMA2000 1X networks are described in documents from "3rd Generation Partnership Project 2" (3GPP2). In system 100, first network 105 is the underlay network, meaning that first network 105 provides wireless service when a second cell in overlay network 125 is powered down. First core network 110 is in communication with the radio access network (RAN). For example, in UMTS networks, the RAN is commonly known as the UMTS Terrestrial RAN (UTRAN) while for GSM networks, the RAN is called the GSM EDGE RAN (GERAN). The RAN includes RAN entity 130 and base station 140. RAN entity 130, if first network 105 is a UMTS network, includes an radio network controller (RNC) and which coordinates base station 140 (which may represent one or more base stations) and serves as an interface between first core network 110 and base station 140. In UMTS networks, base station 140 is commonly known as a Node B which constitute one or more cells; the base station 140 and RAN entity 130 can collectively be referred to as part of a UTRAN. First core network 110 can be capable of handling packet switched and circuit switched information. For example, in UMTS networks, the first core network 110 includes the Serving GPRS supporting node (SGSN) and the Gateway GPRS Support Node (GGSN) for packet switched applications and includes the Mobile Switching Center and Gateway mobile switching center (GMSC) for circuit-switched applications. While first core network 110 is illustrated as in communication with the RAN network, first core network 110 is in communication with multiple cells belong to one or more base station. Only base station 140 is illustrated for simplicity. Furthermore, while RAN entity 130 is illustrated as connected with only base station 140, entity 130 can communicate with multiple base stations (e.g. multiple Node Bs). UE 150, a multi-mode UE, is capable of communicating with multiple networks that utilize different radio access technologies, such as 4G networks and 3G networks.

The second network 125, includes a second core network 120 and a RAN comprising of RAN entity 160 and base station 170. If second network 125 represents an LTE network, the RAN is commonly known as the EUTRAN (evolved UMTS Terrestrial Radio Access Network). LTE may be referred to as a "3G transitional" radio technology, rather than 4G. However, for simplicity, LTE is referred to herein as a 4G radio technology. The second network 125 is an overlay network, meaning, that when cell(s) of the second network is (are) in a powered down state, cell(s) of the underlying network provides wireless service in the same geographic region. The cell belonging to base station 170 and RAN entity 160 are in communication with second core network 120. In LTE, the second core network 120 may be known as the evolved packet core (EPC) consisting of network element such as the Mobility Management entity (MME), Serving Gateway (S-GW) and the PDN gateway (PDN-GW), etc. RAN entity 160 coordinates base station 170. In LTE, the base station and the RAN entity typically are combined into one entity called the eNode B to implement the functions of the EUTRAN. In general, RAN entity 160 serves as an interface between second core network 120 and UE 180; the UE 180 is in communication with RAN entity 160 via wireless communication with base station 170. In some configurations, base station 140 and base station 170 are collocated. UE 180 can be in communication with RAN entity 160 because the services requested by UE 180 are specific to the second network. A 4G-specific service refers to a service that can only be provided via a 4G cell and a 4G network or is preferably provided via a 4G cell and a 4G network. Alternatively, UE 180 can be in communication with RAN entity 160, receiving a similar service on the second network as provided by the first network because the second network is deployed to provide additional network capacity to support more UEs. UE 180 may be able to communicate via multiple networks that utilize different radio technologies, such as 3G and 4G networks. If a UE, such as UE 180-1, requests a service that can be provided by first network 105, UE 180-1 can cease communicating through RAN entity 160 and can communicate through RAN entity 130. Likewise if the first network 105 is experiencing overload conditions, UE 150-1 can cease communicating through RAN entity 130 and can communicate through RAN entity 160.

First core network 110 and second core network 120 are typically in communication with each other; this allows RAN entity 160 and RAN entity 130 to communicate. For instance, if a cell belonging to base station 170 is to enter a powered down state, RAN entity 160, via second core network 120 and first core network 110, sends a notification to RAN entity 130 (and possibly other neighboring RAN entities). RAN Entity 130 can respond, via first core network 110 and second core network 120, to indicate whether the cells belonging to base station 140 that are coordinated by RAN entity 130 are capable of handling additional load from more UEs, such as UE 180. While first network 105 and second network 125 are separate networks utilizing different radio technologies, both networks can be operated by the same wireless service provider.

Figure 2B:
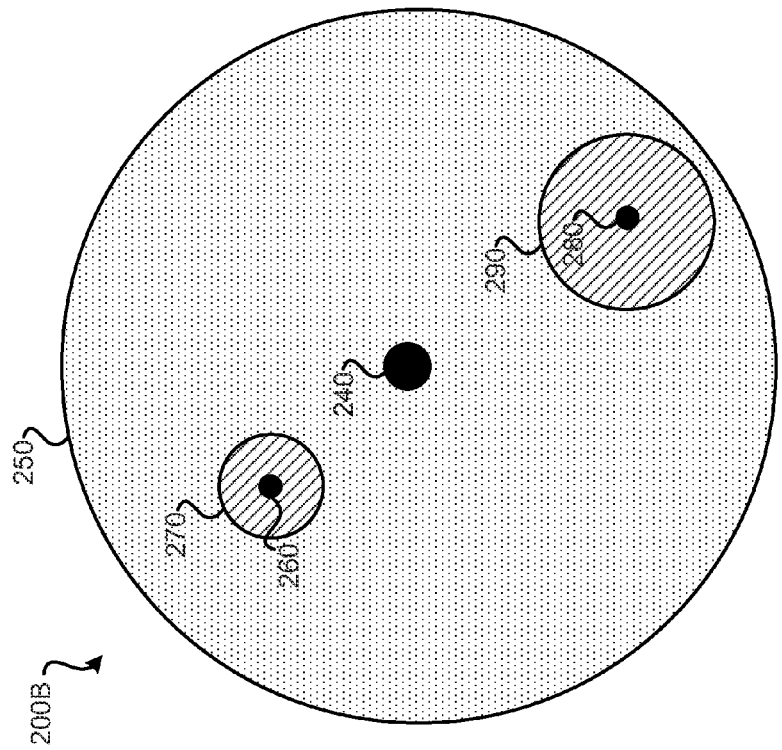
FIGS. 2A and 2B illustrate embodiments of coverage areas for cells of overlay and underlay networks.
Figure 2A:
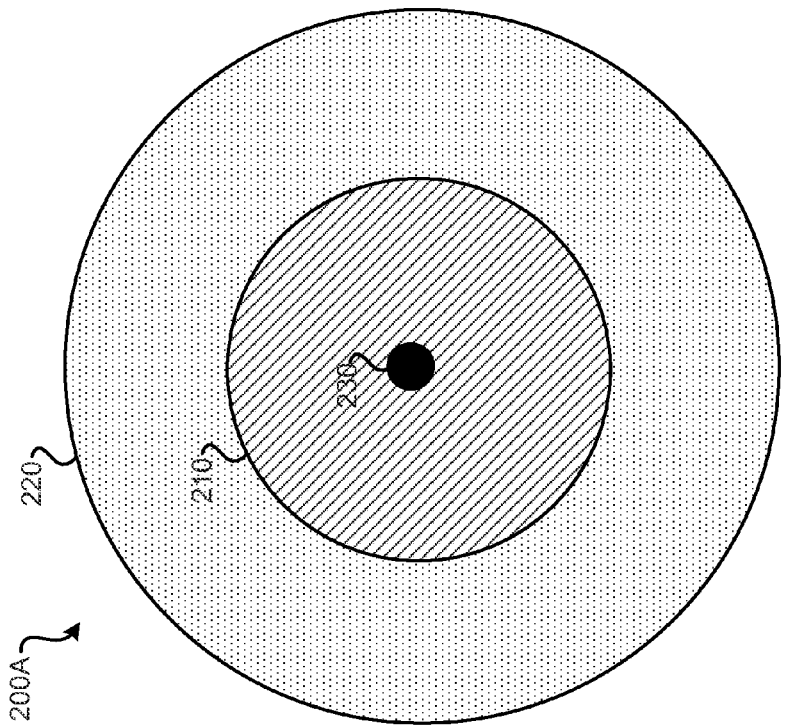

FIG. 2A illustrates an example of coverage areas for cells of different networks. Typically, a 4G cell provides cellular coverage to a smaller geographic area than a 3G or 2G cell. Example 200A represents a configuration where the base station for a 3G or 2G network is located at the same location 230 or a similar location as the base station for a 4G network. Area 210 represents the geographical area provided coverage by the 4G network, such as second network 125 of FIG. 1. Area 220, which includes area 210, represents the geographical area provided coverage by the 3G cell, such as the cell of the first network 105 of FIG. 1. In such a configuration, the 2G/3G network serves as an underlay network and the 4G network serves as an overlay network. Therefore, because the geographical coverage area for the 3G/2G network is larger, UEs can be located in an area where both 4G and 2G/3G coverage is available, or in an area where only 2G/3G coverage is available.

FIG. 2B illustrates another example 200B of coverage areas for cells of different networks that utilize different radio technologies. Rather than a 3G/2G base station and a 4G base station being collocated, various "hotspots" of 4G are deployed within a larger 2G/3G coverage area. 2G/3G base station 240 provides a 2G/3G coverage area 250. Within coverage area 250, two 4G hotspots are present. 4G base station 260 has a coverage area 270 and 4G base station 280 has a coverage area 290. In other configurations, more 4G hotspots can be present within a 2G/3G coverage area 250. Again here, the 2G/3G network serves as an underlay network and the 4G network serves as an overlay network. In the methods that follow, configurations similar to 200A or 200B exist, meaning that if 4G coverage is available to UE via an overlay network, then an underlay network of either 3G or 2G provides coverage to the UE in the same geographical location.

Figure 3:
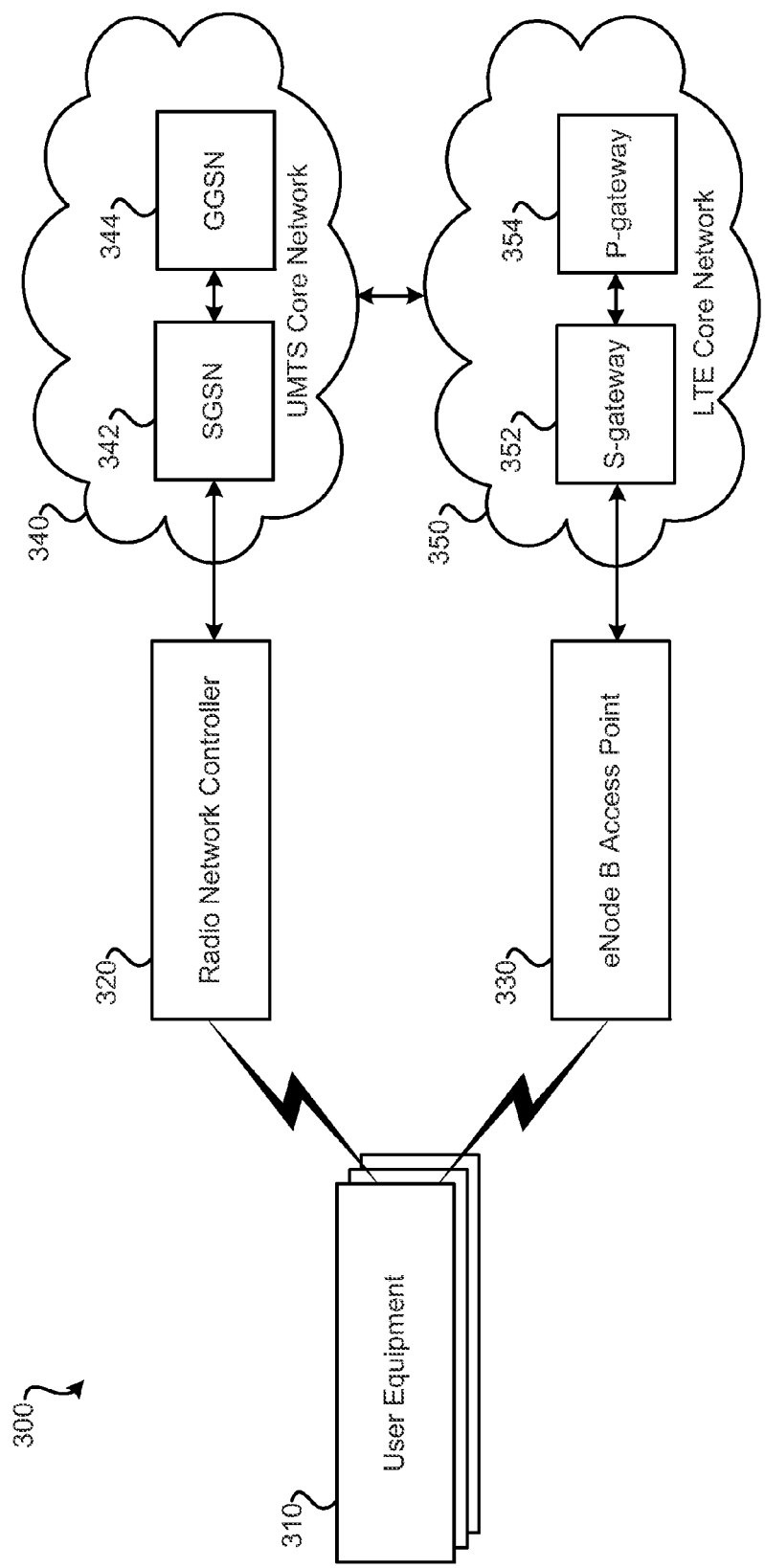
FIG. 3 illustrates an embodiment of a system that includes a cell of a UMTS network and a cell of an LTE network to provide wireless service to a plurality of UEs.

FIG. 3 illustrates an embodiment of a system 300 that includes a cell in a UMTS network and a cell in an LTE network providing service to a UE. The LTE network is functioning as an overlay network and the UMTS network is functioning as an underlay network. UE 310 represents UE 150 and 180 of FIG. 1. UE 310 is capable of communicating with cells in both the UMTS and LTE networks. UE 310 communicates with either radio network controller 320 (through a wireless connection with the Node B; for sake of simplicity, the Node B is not shown in the FIG. 3) or through a wireless connection to the eNode B 330. Data received from the UE 310 is transferred through the radio network controller 320 to the UMTS core network 340, likewise, data received from the UMTS core network 340 for the UE 310 can be transferred through the radio network controller 320. Radio network controller 320 can represent first RAN entity 130 of FIG. 1. When the radio network controller 320 is communicating with UMTS core network 340, radio network controller 320 is communicating directly with SGSN (Serving GPRS {General Packet Radio Service} Support Node) of the UMTS network) 342. UMTS core network 340 contains multiple SGSNs; only the SGSN in communication with radio network controller 320 is illustrated. An SGSN 342 communicates with one or more radio network controllers within a specified geographical area. The SGSN routes packet switched data from the radio network controllers to the GGSN (Gateway GPRS Support Node) 344 or from the GGSN to the radio network controllers. GGSN 344 serves as an interface with external networks, such as the internet and/or other public and private data networks.

The UE 310 communicates with eNode B 330, which is connected with the LTE core network 350. LTE core network 350 includes S-Gateway 352 and P-Gateway 354. S-Gateway 352 communicates packet switched data between eNode Bs 330 and P-Gateway 354 within a specified geographical area. P-Gateway 354 serves as an interface with external networks, such as the internet and/or other public and private data networks. eNode B 330 can represent a combination of the second RAN entity 160 and base station 170 of FIG. 1. At an instance in time, a multimode UE 310 can communicate with either radio network controller 320 or eNode B 330. If eNode B 330 sends a message to radio network controller 320, the message is sent to LTE core network 350, which sends the message to UMTS core network 340. UMTS core network 340 then routes the message to radio network controller 320. Communication from radio network controller 320 to eNode B 330 is also possible via the reverse route. In some configurations, communication between eNode B 330 and radio network controller 320 is achieved by using the RAN information management (RIM) protocol (defined by the 3GPP standards) to transfer messages. This protocol may allow messages to be forwarded transparently, from a RAN entity (e.g. the radio network controller) in a network to another RAN entity in another network of a different RAT (e.g. eNode B) without the intermediary nodes in the network (e.g. the UMTS and LTE core networks) interpreting the contents of the messages. RIM can ensure that as new messages are defined and communicated between any two RAN entities in different networks with different RATs, the core networks may not need to be upgraded to support these messages. In some other configurations, radio network controller 320 and eNode B 330 can communicate via alternative paths (such as directly), thereby avoiding having to route messages via UMTS core network 340 and LTE core network 350.

Figure 4:
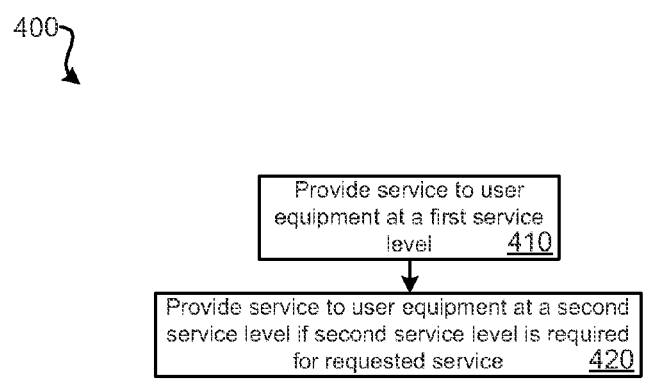
FIG. 4 illustrates an embodiment of a method for having UEs utilize a 3G network unless a 4G-specific service is requested.

The 3G and 4G networks represent networks that utilize different radio technologies. For example, wireless communication in a UMTS network is based on a Radio access technology called Wide Code Division Multiple Access (WCDMA) technology which uses orthogonal code sequences to separate UEs transmitting within the same band. On the other hand, LTE air interface uses Orthogonal Frequency Division Multiple Access (OFDMA) where UEs transmitting in this same band are separated by time and frequency resources. These radio technologies are in general not be compatible. For example, a different protocol and/or frequency is required used to communicate with radio network controller 320 (and is associated Node B) than to communicate with eNode B point 330. Likewise, the UMTS core network and LTE core network procedures are different although the framework of the core networks are quite similar. While FIG. 3 illustrates UE 310 communicating with 3G and 4G networks, in other configurations UE 310 can communicate using other technologies, such as 2G technology like GSM or 1X RTT/CDMA2000 1X FIG. 4 illustrates an embodiment of a method 400 for having UE utilize a first service level network unless a second service level specific service is requested. Method 400 is performed in a geographic area where both the first (such as 2G or 3G) and second (such as 4G) service levels are available, such as in the overlapping coverage areas of FIGS. 2A and 2B. At stage 410, UE is provided service at a first service level by a first cell. This service level is a 2G or 3G service level and is provided via one or more cells that provide 2G or 3G service. These cells are coordinated by, a base station controller (in 2G networks) or a radio network controller (in 3G networks), such as radio network controller 320 of FIG. 3. The different service level represents a lower level of service (e.g., lower data transmission rates, higher latency) than the second service level, such as a 4G service level.

At stage 420, if a UE requests a service that is preferably provided at the second service level, such as video chat, the UE can be provided service at the second service level by a second cell. As long as the UE is utilizing the second service level service, the UE may continue to be provided service via the cell providing the second service level. Once the second service level is no longer required, the UE can be instructed to switch back to the first service level provided by the first cell. Predefined conditions can be evaluated to determine whether UE should be provided with the second service level. For example, the second service level might only be available certain hours of the day or days of the week.

Figure 5:
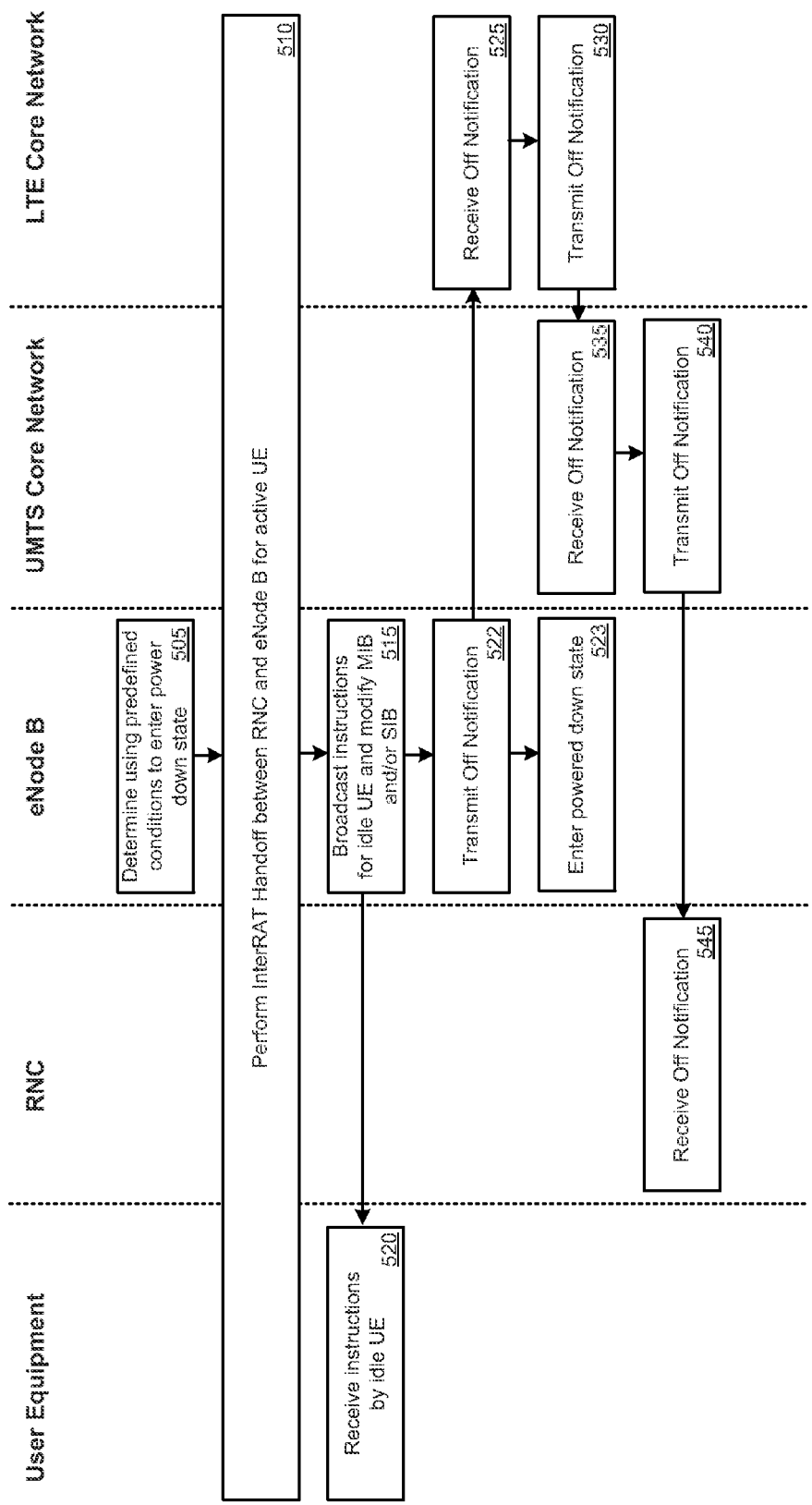
FIG. 5 illustrates an embodiment of a method for an LTE cell entering a powered down state.

Method 400 provides a simplified method of when UE is provided with 2G/3G service or 4G service. The following methods describe in greater detail circumstances under which an LTE cell enters and exits a powered downstate; some of these triggers include load, time, coverage optimization and UE requested level of service FIG. 5 illustrates an embodiment of a method 500 for a 4G cell to enter a powered down state. Method 500 is illustrated as a swim diagram showing the information exchanged between UE, such as UE 150 and 180 of FIG. 1 and UE 310 of FIG. 3, radio network controller, such as the RAN entity 130 of FIG. 1 and radio network controller 320 of FIG. 3, eNode B, such as a combination of RAN entity 160 and base station 170 of FIG. 1 and eNode B 330 of FIG. 3, UMTS core network, such as first core network 110 of FIG. 1 and UMTS core network 340 of FIG. 3, and LTE core network, such as second core network 120 of FIG. 1 and LTE core network 350 of FIG. 3.

At stage 505, the eNode B determines to enter a powered down state based on predefined conditions. In some configurations, the powered down state refers to powering off the Radio frequency (RF) components in the base station part of the eNode B or putting these components in a low power state. In some configurations, the eNode B may be totally powered down or various components of the eNode B components are either partially or totally powered off or kept in a low power state. The low power state may include entering a discontinuous transmission (DTX) and of a discontinuous reception (DRX) mode where the transmitter and receiver components in the eNode B, respectively, are powered off periodically. The predefined conditions on which the eNode B bases its decision to enter a powered down state may include a time-based trigger (e.g., certain times of day, days of the week, and/or days of the year); the preconfigured time periods can be obtained from statistical traffic information gathered over an extended period of time from the network. Another example of a predefined condition which could trigger the eNode B to power-off is a load trigger-based on the load of the eNode B (e.g., if a particular cell or group of cells are experiencing load(s) below a pre-configured load threshold, so that the cell(s) are considered to be under-loaded and hence can be powered-off. As discussed earlier also, if the services requested by UE can be provided by UMTS network, the eNode B can powered off. In some configurations, the decision to power off the eNode B is due to a request received from other RAN entities in order to interference caused by the eNode B. If, according to the predefined conditions, the eNode B determines to enter a powered down state, UE currently accessing and configured to access the eNode B is directed to access the UMTS network via the radio network controller through the Node B. UE functions in at least two modes, the active mode and an idle mode. Active mode refers to a mode where UE is continuously exchanging information with a base station or eNode B. For example, in active mode, a consumer might be performing actions such as: conducting a phone call, sending or receiving a text message, surfing the Internet, or streaming music. In idle mode, the UE is powered on and may be receiving signals, but the UE is not currently transmitting information to the base station, Node B, or eNode B. An example of UE in idle mode includes UE that is turned on but sitting unused in the consumer's pocket.

At stage 510, an inter-RAT (radio access technology) handover is performed to handover one or more UEs in active mode with the eNode B to the radio network controller. Other procedures that can be used in used in moving UEs from one RAT to another are the cell redirection and Radio Resource Control (RRC) Release procedures. These procedures and the inter-RAT handover procedure between an LTE and UMTS network are well documented in the 3GPP Standards and therefore, they are not described in detail in this application.

At stage 515, a message is broadcast by the eNode B to UEs in idle mode instructing these UEs to use the UMTS network as the default network rather than the LTE network. In some configurations, prior to entering a powered down state, the message comprises a modified master information block (MIB) and/or system information block (SIB) to reflect that the LTE cell has entered a powered down state and that a UMTS cell is preferable. In addition, this modified MIB/SIB may include information about the power status and transmission schedules (e.g. DTX/DRX schedules) of the eNode B. Typically, MIB and SIB are used in UMTS and LTE networks for broadcasting information such as: schedules, current cell, and other cell information, to the UEs. The broadcast messages discussed in stage 515 would be carried in the MIB & SIBs.

At stage 520, these instructions are received by the idle mode UEs. In some configurations, a message is not broadcast at stage 515. Rather, when the cell including the eNode B enters the powered down state, the idle mode UEs switch to the UMTS network because they can no longer communicate with the eNode B. In some configurations, rather than switching immediately from a powered up state to a powered down state, the transmit power of the eNode B is gradually decreased until the powered down state is reached. This allows UEs to cease communicating with the LTE cell at different times (as some UEs are expected to be closer to the 4G cell than others and would require less power from the LTE eNode B in order to maintain a communication link) and, therefore, transfer to the UMTS cell(s) at different times, rather than a potentially large number of UEs transferring to the UMTS network at once.

At stage 522, the eNode B access node transmits an "OFF" notification to one or more neighboring network entities indicating that the eNode B is entering a powered down state. This notification is received by the LTE core network (stage 525), and transmitted to (stage 530) and received by (stage 535) the UMTS core Network. The UMTS core Network transmits (stage 540) the notification to the radio network controller of the 3G cell(s) providing coverage to the same geographical area as the LTE cell. At stage 545, the radio network controller receives the "OFF" notification. Following stage 522, the eNode B enters a powered down state.

Figure 6A:
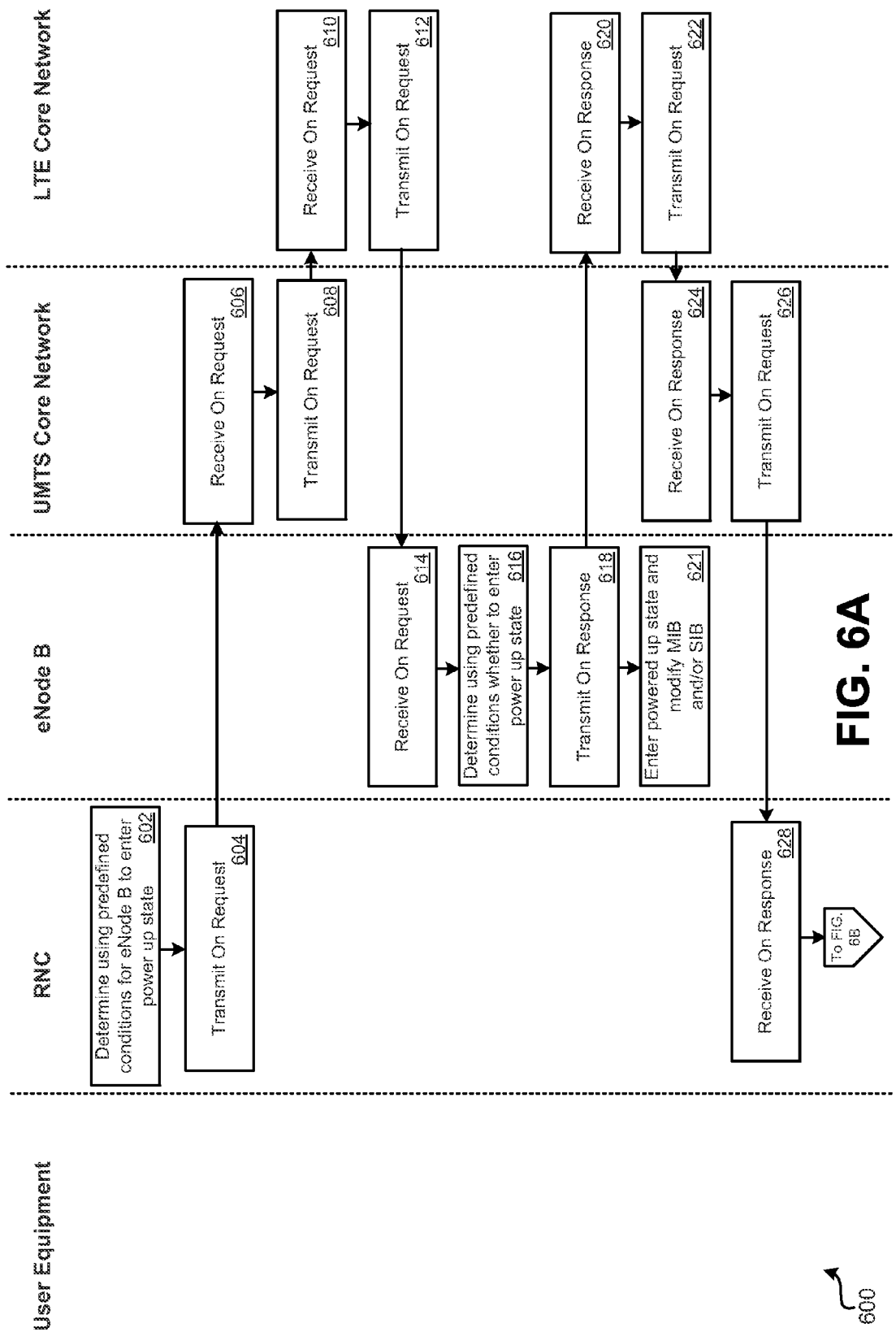
FIGS. 6A and 6B illustrate an embodiment of a method for an LTE cell entering a powered up state based on a request sent by a radio network controller of a UMTS cell.
Figure 6B:
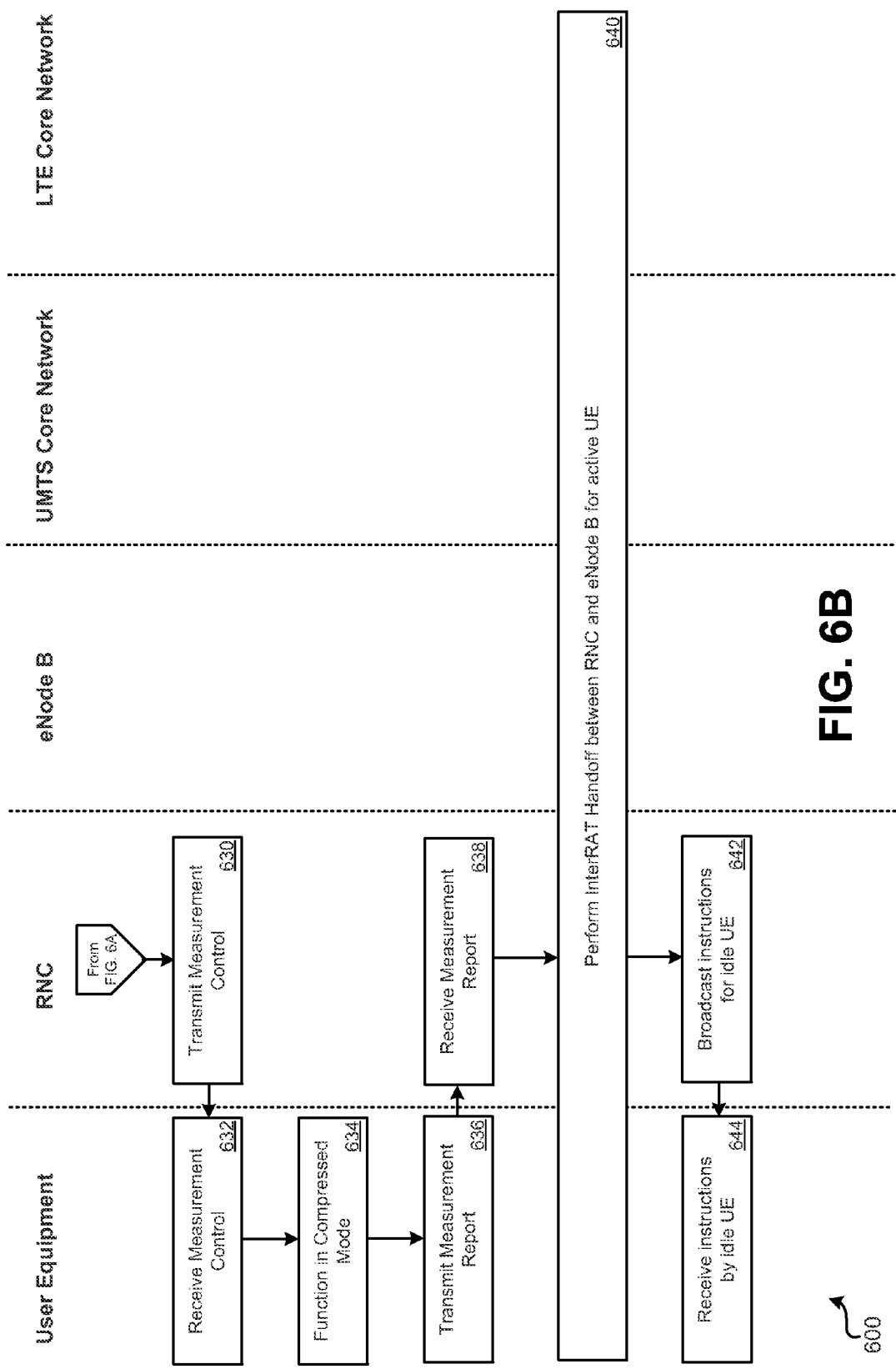

In some configurations, rather than performing the inter-RAT handover of active UE, broadcasting to idle UEs before sending the notification to the radio network controller or sending the "OFF" notification, messages are exchanged between the radio network controller and the eNode B. The message exchange could include: an exchange of parameters, load information, an "OFF" request from the radio network controller, etc. The eNode B may take such parameters into consideration in deciding whether to turn off its cell or not. This message exchange may allow the eNode B to decide whether the radio network controller can handle the additional load from the eNode B or not. If not, the eNode B may remain in a powered up state. In some configurations, the "OFF" notification is transmitted by the eNode B to the radio network controller before the inter-RAT handover of active UEs and before broadcasting to idle UEs. As such, the notification can assist the radio network controller in preparing resources for the active and idle mode UEs that would be transferred from the eNode B before UEs are moved over to the UMTS cells from the LTE cells While method 500 details an LTE cell entering a powered down state, FIGS. 6A and 6B illustrate an embodiment of a method 600 for an LTE cell entering a powered up state based on a request from a radio network controller of a UMTS network. The UE, radio network controller, eNode B, UMTS core network, and LTE core network represent the same components as those of method 500. At stage 602, the radio network controller, using predefined conditions, determines if the LTE cell of the eNode B should be requested to enter a powered up state and provide service to UEs. The predefined conditions which the radio network controller uses to make the determination can include conditions such as: a UE has requested a 4G-specific service, the load on the UMTS cells supported by the radio network controller is above a threshold load (hence, the cells are considered overloaded), a predetermined schedule indicating to the radio network controller when to request the eNode B to power up, and/or coverage optimization (that is, some UEs are experiencing weak signal strength while on the UMTS cells and would request that the LTE cell to be powered up to help in improving the signal strength experienced by these UEs). Other conditions are also possible.

At stage 604, the radio network controller transmits an "ON" request message. The UMTS core network receives the "ON" request (stage 606) and transmits (stage 608) the request to the LTE core network. The LTE core network receives the on request at stage 610. The LTE core network transmits (stage 612) the "ON" request to the eNode B controlling the powered off LTE cell(s) that are overlaid on the 3G cell(s) coordinated by the radio network controller. At stage 614 the eNode B receives the "ON" request message. At stage 616, the eNode B access point can evaluate a set of predefined conditions to determine whether the eNode B access point should enter a powered up state in response to the request received from the radio network controller of the UMTS cell. These predefined conditions can include conditions such as: a predefined schedule. In some configurations, if the eNode B receives a request to turn on, the eNode B does not evaluate a set of predefined conditions, rather, the eNode B enters a powered up state without further evaluation. In some configurations, "ON" requests from certain radio network controllers are accepted while others are not. At stage 618, the eNode B transmits an "ON" response indicating whether the LTE cell is entering a powered up state. The "ON" response is received by the LTE core network (stage 620), the LTE core network transmits (stage 622) the response to the UMTS core network, the UMTS core network receives (stage 624) the response and transmits (stage 626) the "ON" response to the radio network controller. At stage 628, the radio network controller receives the "ON" response from the eNode B. In some configurations, an "ON" notification message may be sent to neighboring nodes in the LTE or other networks indicating that the LTE cell is currently powered on.

At stage 630, a measurement control message is transmitted by the radio network controller to UEs in active mode. The measurement control message is received by the active UE at stage 632. The measurement control message notifies the UEs in active mode to determine whether communication with the eNode B is possible by measuring the signal strength of the power received from the eNode B. At stage 634, the active mode UE functions in compressed mode, a mode where the UE briefly switches to LTE network, performs a measurement on the LTE cell, and returns to the UMTS network to continue the current data exchange with the UMTS cell. At stage 636, the UE transmits a measurement report indicating the result of the measurements taken by the UE during compressed mode. Typically, if the measurements taken on the LTE cell indicate that the UE receives a "strong" signal from the LTE cell, the UE would be allowed to switch to the LTE cell. Otherwise, the UE would be directed to stay on the UMTS cell. At stage 638, the measurement report is received by the radio network controller of the UMTS cell.

If the radio network controller allows the UE to switch to the LTE cell at stage 640, an inter-RAT handover for the UE is performed between the radio network controller and eNode B after which the UE will be directed to access the LTE cell. Again, cell redirection and RRC release procedures can also be used in moving UEs from the UMTS cell to the LTE cell. These procedures and the inter-RAT handover process are documented in the 3GPP standards and therefore, are not described in detail in this application. At stage 642, a broadcast message is transmitted by the radio network controller indicating the LTE cell is preferred over UMTS cells in order to direct idle mode UEs move to the LTE cell. Again, this broadcast message can be sent using modified MIB or SIB messages. In some configurations, this message is transmitted by the eNode B. For example, once the determination by the eNode B to enter a powered up state has been completed and the eNode B is to enter the powered up state (or already has), the eNode B may modify (stage 621) a MIB and/or a SIB to indicate that the LTE cell of the eNode B is to be given priority over the corresponding UMTS cell associated with the radio network controller. This would enable some of the idle mode UEs to move from the UMTS network to the LTE network. In some configurations, if the LTE cell is powered on due to a request by a particular UE for application requiring a Quality of service (QoS) not provided on the UMTS network, the modification of MIB/SIB in stage 621 or the sending of broadcast information at stage 642 may not be necessary since only a particular UE may be moved to the LTE network.

At stage 644, the instructions are received by idle mode UEs. For example, if the load on the (UMTS cells supported) by the radio network controller is above a threshold value, the broadcast instructions may indicate that the idle mode UEs are to make the LTE network the preferred network. A preferred network refers to which network, if multiple network options are present, the UE will select to communicate with. In some configurations, the broadcast information indicates that the UMTS network is to remain the preferred network. In some configurations, no information is broadcasted to idle mode UEs following the LTE cell entering a powered up state. Also, in some configurations, the broadcasting of information to idle mode UEs (at stage 644) could be performed before the inter-RAT handover of stage 640.

In some configurations, an LTE cell can be powered back on based on a timer in the eNode B or other internal triggers that could make the eNode B exit the powered down state and enter the powered up state without the eNode B receiving a request from other external nodes in the network as described in FIGS. 6A and 6B.

Figure 7A:
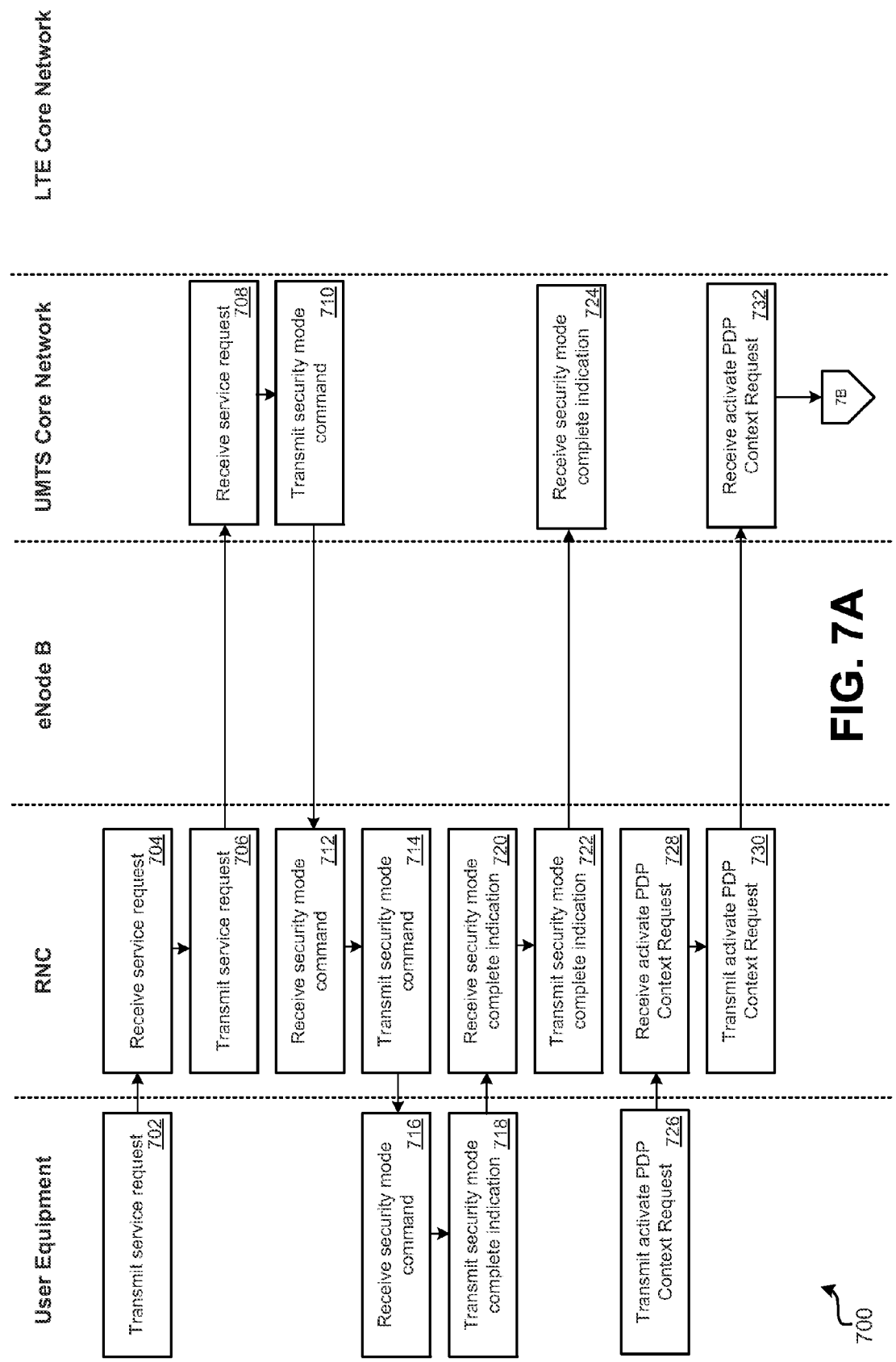
FIGS. 7A and 7B illustrate an embodiment of a method for a LTE cell entering a powered up state based on a UE-initiated request for a 4G service.
Figure 7B:
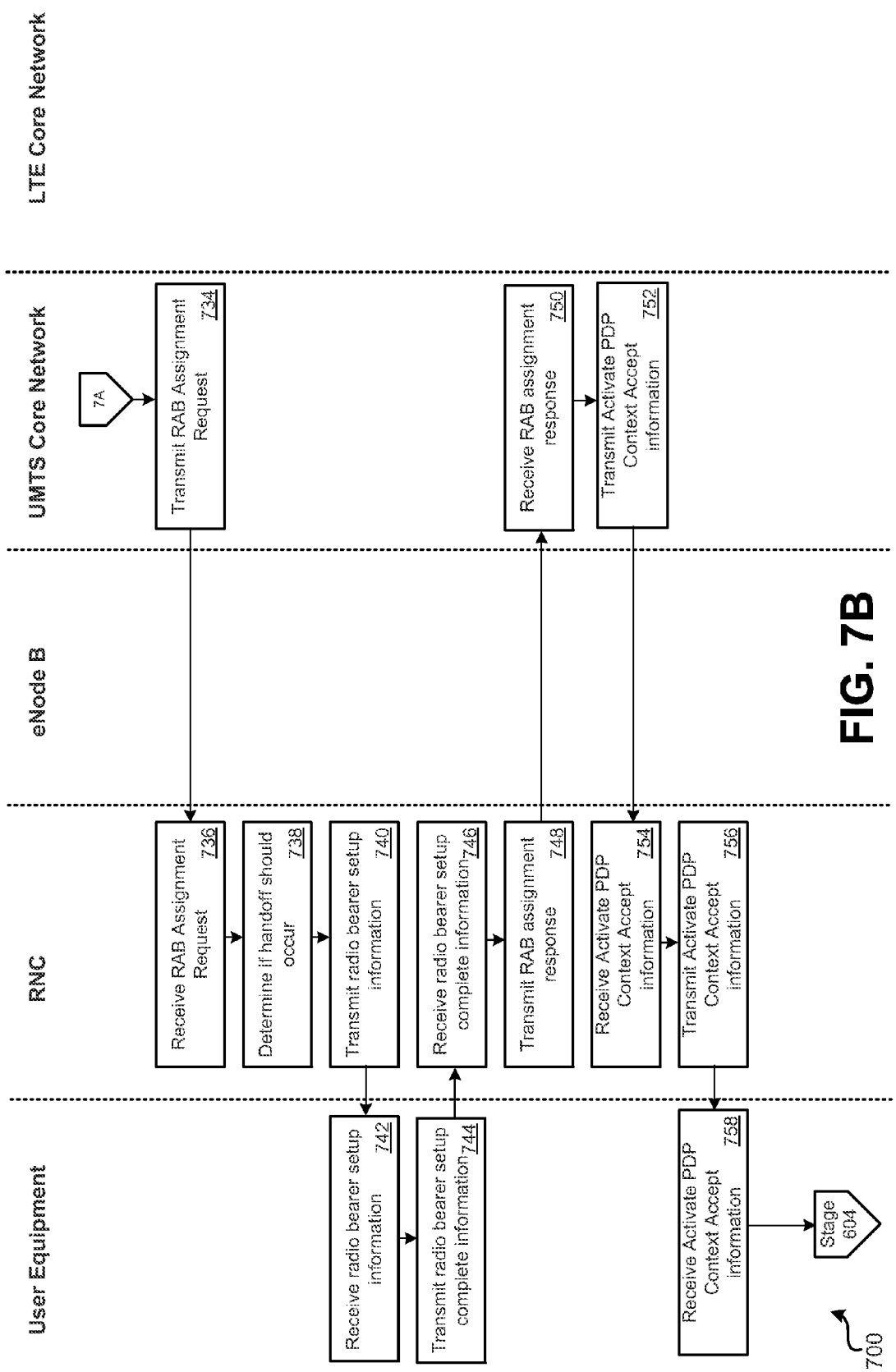

FIGS. 7A and 7B illustrate an embodiment of method 700 for an LTE cell entering a powered up state based on a UE-initiated request for a 4G-specific service. At stage 702, a UE requests a 4G-specific service. This request is received by the radio network controller (of the UMTS cell) at stage 704. The radio network controller transmits (stage 706) a service request to the UMTS core network. The service request is received by the UMTS core network at stage 708. In response to receiving the service request, the UMTS core network transmits (stage 710) a security mode command to the radio network controller. The security mode command is received by the radio network controller (stage 712) and transmitted (stage 714) to the UE. At stage 716, the security mode command is received by the UE. In response to the security mode command, the UE transmits (stage 718) a security mode complete indication, which is received (stage 720) by the radio network controller. The radio network controller transmits (stage 722) the security mode complete indication to the UMTS core network. At stage 724, the UMTS core network receives the security mode complete indication.

At stage 726, an activate PDP (Packet Data Protocol) Context Request is transmitted by the UE. The activate PDP request is received (stage 728) by the radio network controller and transmitted (stage 730) to the UMTS core network. At stage 732, the activate PDP context request is received by the UMTS core network. Method 700 continues on FIG. 7B. At stage 734, an RAB (Radio Access Bearer) assignment request is transmitted from the UMTS core network and received (stage 736) by the radio network controller. At stage 738, the radio network controller makes a determination of whether the UE requesting the service should be handed over to a cell in the LTE network. At stage 740, radio bearer setup information is transmitted by the radio network controller and received by the UE. At stage 744, information indicating that the radio bearer setup is complete is transmitted to the radio network controller. The radio network controller receives (stage 746) this information and transmits (stage 748) a radio access bearer assignment response to the UMTS core network. This response is received by the UMTS core network at stage 750. At stage 752, the UMTS core network transmits activate PDP context information to the radio network controller. At stage 754, this information is received, and transmitted (stage 756) by the radio network controller to the UE. At stage 758, the activate PDP context accept information is received by the UE.

Although, the requested QoS by the UE requires an LTE network, the UE may first assigned resources on the UMTS network by the radio network controller (as discussed in stages 702 to 758). Following stage 758, the radio network controller sends an "ON" request message to the eNode B to enter a powered up state, as detailed at stage 604 of FIG. 6A. The remainder of method 700 follows method 600 from stage 604. Once the eNode B is in powered up state, the UE is moved over to the LTE network using inter-RAT handover procedure or similar procedures.

Figure 8:
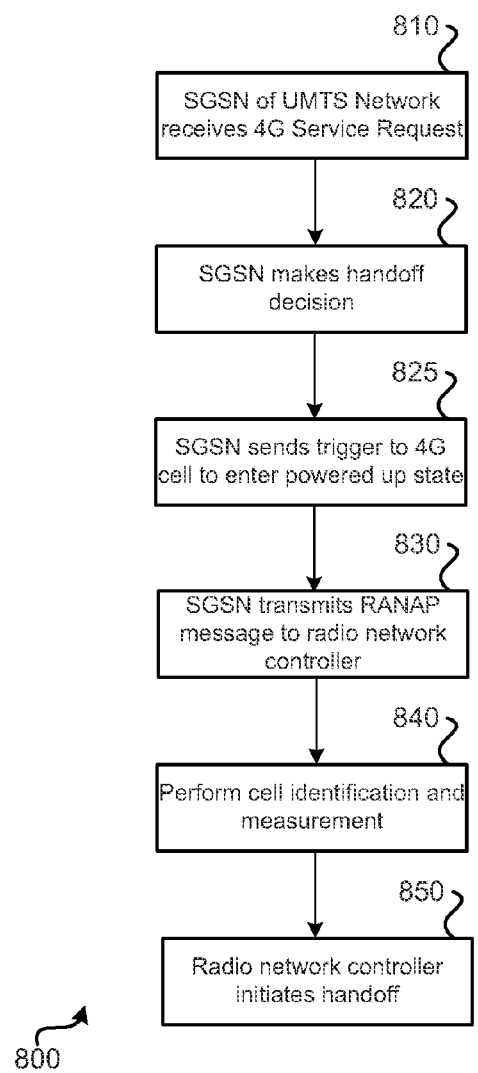
FIG. 8 illustrates an embodiment of a method for having an SGSN of a UMTS network determine that an LTE cell should enter a powered up state.

In some configurations, instead of a RAN entity in the UMTS network (e.g., radio network controller) making the decision to power up an LTE cell currently in a powered down state, the decision may be made by an entity in the UMTS core network (e.g., the SGSN). FIG. 8 illustrates an embodiment of a method 800 for having an SGSN of a UMTS core network determine that an LTE cell should enter a powered up state and the UE requested service should be handover to that LTE cell. At stage 810, the SGSN of the UMTS core network receives a service request from a UE for a QoS supported by LTE networks. At stage 820, based on the requested QoS in the service request and the QoS available on the UMTS network, the SGSN makes the decision that the UE requesting the service should be handed over to the LTE cell. In this case, the decision to handover the UE to another RAT can be based on QoS, in other configurations the decision can be made based on other set(s) of predefined conditions evaluated by the SGSN. If the decision is that the UE should be handed over to the LTE cell, the SGSN may also determine which LTE cell and if the LTE cell is in powered down state. To power on a LTE cell in powered down state, the SGSN transmits (stage 825) a trigger to the cell, via the UMTS core network and the LTE core network.

Once the SGSN receives confirmation that the LTE cell is in powered up state, at stage 830, the SGSN may transmit a RANAP (Radio Access Network Application Part) message to the radio network controller of the 3G network. This message contains an indicator that notifies the radio network controller to trigger a handover from UMTS cell to the LTE cell for the UE. At stage 840, cell identification and measurement is performed by the UE. Stage 840 comprises stages such as 630 through 638 of FIG. 6B. Following cell identification and measurement, the radio network controller initiates a handover with the handover procedure and sends a handover command to the UE requesting the UE access the LTE cell at stage 850.

Figure 9:
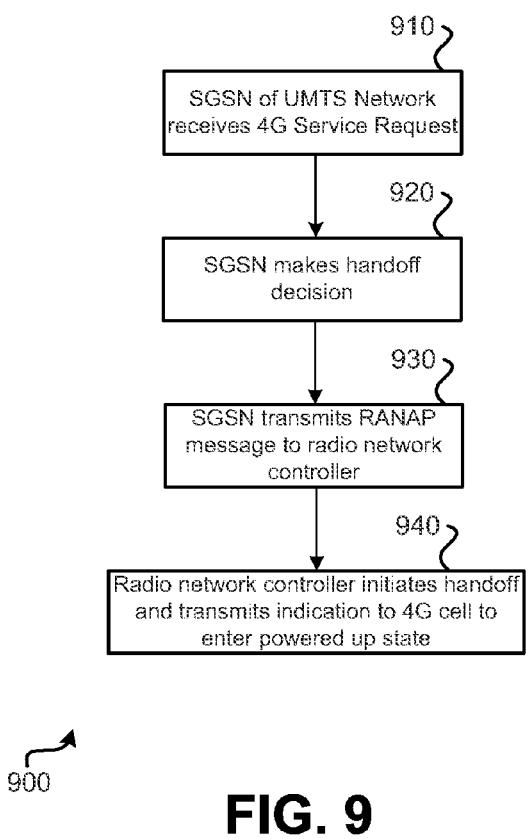
FIG. 9 illustrates another embodiment of a method for having an SGSN of a 3G network determine that an LTE cell should enter a powered up state.

FIG. 9 illustrates another embodiment of a method 900 whereby the decision to request a powered down LTE cell to transition to the powered up state is evaluated by an SGSN in a UMTS core network. At stage 910, the SGSN in a UMTS core network receives a service request from a radio network controller indicating a UE request for QoS that is supported by an LTE network but not the UMTS core network. At stage 920, a decision is made by the SGSN that a handover to an LTE cell is required to support the service request. At stage 930, the SGSN transmits a RANAP (Radio Access Network Application Part) message to the radio network controller of the 3G network. This message contains an indicator that notifies the radio network controller that a handover to LTE cell is required in order to service this request. At stage 940, based on the indicator in the RANAP message, the radio network controller initiates a handover procedure with the LTE network. In addition, if the LTE cell required for this handover is found to be in the power down state, the radio network controller transmits an "ON request" to the eNode B asking the LTE cell to enter the powered up state.

While the preceding configurations detail a cell in an LTE network entering a powered up or a powered down state and handing over UEs to either cells in a UMTS network or a cells in a 2G network such as GSM, the principles described herein are applicable to other wireless communication arrangements. For example, the configurations detailed herein can be applied to other situations were wireless coverage for multiple networks overlaps and utilize different radio technologies. For example, the overlay network may be a 4G or 3G network, while the underlay network may be a 3G or 2G network.

Figure 10:
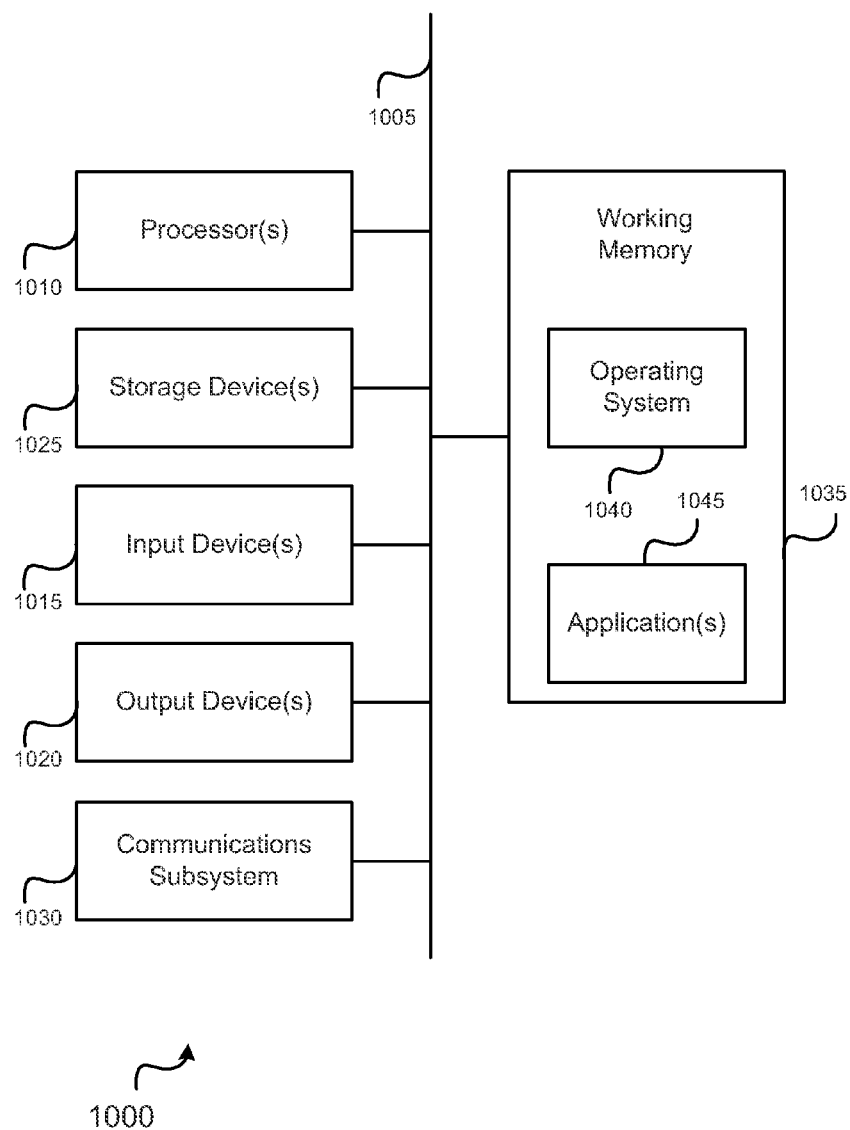
FIG. 10 illustrates an embodiment of a computer system.

To perform the actions of the radio network controller, eNode B, UE, or any other computerized device previously detailed, a computer system containing components such as those illustrated in FIG. 10 may be used. FIG. 10 provides a schematic illustration of one embodiment of a computer system 1000 that can perform the methods provided by various other embodiments, as described herein, and/or can function as the host computer system, a remote kiosk/terminal, a point-of-sale device, a mobile device, and/or a computer system. FIG. 10 is meant only to provide a generalized illustration of various components, any or all of which may be utilized as appropriate. FIG. 10, therefore, broadly illustrates how individual system elements may be implemented in a relatively separated or relatively more integrated manner.

The computer system 1000 is shown comprising hardware elements that can be electrically coupled via a bus 1005 (or may otherwise be in communication, as appropriate). The hardware elements may include one or more processors 1010, including without limitation one or more general-purpose processors and/or one or more special-purpose processors (such as digital signal processing chips, graphics acceleration processors, and/or the like); one or more input devices 1015, which can include without limitation a mouse, a keyboard and/or the like; and one or more output devices 1020, which can include without limitation a display device, a printer and/or the like.

The computer system 1000 may further include (and/or be in communication with) one or more non-transitory storage devices 1025, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 1000 might also include a communications subsystem 1030, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 1030 may permit data to be exchanged with a network (such as the network described below, to name one example), other computer systems, and/or any other devices described herein. In many embodiments, the computer system 1000 will further comprise a non-transitory working memory 1035, which can include a RAM or ROM device, as described above.

The computer system 1000 also can comprise software elements, shown as being currently located within the working memory 1035, including an operating system 1040, device drivers, executable libraries, and/or other code, such as one or more application programs 1045, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 1025 described above. In some cases, the storage medium might be incorporated within a computer system, such as the system 1000. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computer system 1000) to perform methods in accordance with the disclosure. For example, some or all of the procedures of the described methods may be performed by the computer system 1000 in response to processor 1010 executing one or more sequences of one or more instructions (which might be incorporated into the operating system 1040 and/or other code, such as an application program 1045) contained in the working memory 1035. Such instructions may be read into the working memory 1035 from another computer-readable medium, such as one or more of the storage device(s) 1025. Merely by way of example, execution of the sequences of instructions contained in the working memory 1035 might cause the processor(s) 1010 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 1000, various computer-readable media might be involved in providing instructions/code to processor(s) 1010 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 1025. Volatile media include, without limitation, dynamic memory, such as the working memory 1035. Transmission media include, without limitation, coaxial cables, copper wire and fiber optics, including the wires that comprise the bus 1005, as well as the various components of the communication subsystem 1030 (and/or the media by which the communications subsystem 1030 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 1010 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1000. These signals, which might be in the form of electromagnetic signals, acoustic signals, optical signals and/or the like, are all examples of carrier waves on which instructions can be encoded, in accordance with various embodiments of the invention.

The communications subsystem 1030 (and/or components thereof) generally will receive the signals, and the bus 1005 then might carry the signals (and/or the data, instructions, etc. carried by the signals) to the working memory 1035, from which the processor(s) 1005 retrieves and executes the instructions. The instructions received by the working memory 1035 may optionally be stored on a storage device 1025 either before or after execution by the processor(s) 1010.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

What is claimed is:

1. A system for managing wireless network communication, the system comprising:
    a first cell that uses a first radio access technology (RAT), the first cell having a powered up state and a powered down state, the first cell configured to:
        transmit and receive data with a plurality of UEs;
        based on a first set of one or more predefined conditions, enter the powered down state wherein the first cell consumes less power in the powered down state than in the powered up state; and
        based on a second set of one or more predefined conditions, enter the powered up state, wherein the first cell consumes more power in the powered up state than in the powered down state; and
    a second cell using a second RAT, configured to:
        communicate with the first cell;
        provide wireless service to the plurality of UEs at least when the first cell that uses the first RAT is in the powered down state; and
        transfer at least one UE of the plurality of UEs to use the first cell when the first cell is in the powered up state, wherein the first set of one or more predefined conditions comprises a condition that none of the plurality of UEs is using a service supported by the first RAT but not the second RAT.

2. The system of claim 1, wherein the first set of one or more predefined conditions comprises a condition that if a load on the first cell that uses the first RAT is below a predefined threshold.

3. The system of claim 1, wherein the first set of one or more predefined conditions comprises a condition that a timer for entering the power down state has triggered.

4. The system of claim 1, wherein the second set of one or more predefined conditions comprises a condition of a portion of the plurality of UEs receiving service from the second cell reporting weak signal receipt.

5. The system of claim 1, wherein the second set of one or more predefined conditions comprises a condition that a particular UE receiving service from the second cell requests a quality of service or application that is not supported by the second RAT but is supported by the first RAT.

6. The system of claim 1, wherein the second set of one or more predefined conditions comprises a condition that a load of the second cell using the second RAT exceeds a threshold load.

7. The system of claim 1, wherein the second set of one or more predefined conditions comprises a condition that a timer for exiting the power down state has triggered.

8. The system of claim 1, further comprising:
a radio access network (RAN) that uses the second RAT and comprises the second cell, wherein:
the first set, the second set, or both sets of one or more predefined conditions are configured to be evaluated by the RAN.

9. The system of claim 8, wherein the radio access network is selected from a group consisting of:
a UMTS radio access network (UTRAN); and
a GSM Edge radio access network (GERAN).

10. The system of claim 1, further comprising:
a core network of the second RAT and comprises the second cell, wherein:
the first set, the second set, or both sets of one or more predefined conditions are evaluated by the core network.

11. The system of claim 1, wherein the first cell comprises an eNodeB and the first RAT is LTE, wherein:
the first set, the second set, or both sets of one or more predefined conditions is evaluated by the eNode B.

12. The system of claim 1, further comprising a radio network controller that uses the second RAT and communicates with the second cell, wherein:
the second set of one or more predefined conditions is configured to be evaluated by the radio network controller.

13. The system of claim 1, wherein:
the second cell that uses the second RAT is further configured to:
during or following the first cell entering the powered up state, broadcast information to at least a portion of the plurality of UEs that instructs the portion of the plurality of UEs to make the first RAT preferred over the second RAT.

14. The system of claim 1, wherein:
the second cell that uses the second RAT is further configured to:
during or following the first cell entering the powered down state, broadcast information to at least a portion of the plurality of UEs that instructs the portion of the plurality of UEs to make the second RAT preferred over the first RAT.

15. The system of claim 1, wherein:
the first cell that uses the first RAT is further configured to participate in an inter-RAT handover process to move one or more UEs of the plurality of UEs to the second cell that uses the second RAT.

16. The system of claim 1, wherein:
the second cell that uses the second RAT is further configured to participate in an inter-RAT handover process to move one or more UEs of the plurality of UEs to the first cell that uses the first RAT.

* * * * *